US012811786B2

(12) United States Patent
Solanki

(10) Patent No.: US 12,811,786 B2
(45) Date of Patent: Nov. 24, 2026

(54) PUBLIC KEY CRYPTOGRAPHY WITH PASSWORD PROTECTION

(71) Applicant: DigiCert, Inc., Lehi, UT (US)

(72) Inventor: Bhupendra Singh Solanki, Bengaluru (IN)

(73) Assignee: DigiCert, Inc., Lehi, UT (US)

( * ) Notice: Subject to any disclaimer, the term of this patent is extended or adjusted under 35 U.S.C. 154(b) by 23 days.

(21) Appl. No.: 18/959,777

(22) Filed: Nov. 26, 2024

(65) Prior Publication Data

US 2026/0106753 A1 Apr. 16, 2026

(30) Foreign Application Priority Data

Oct. 14, 2024 (IN) ............................ 202441077795

(51) Int. Cl.
*H04L 9/14* (2006.01)
*H04L 9/32* (2006.01)

(52) U.S. Cl.
CPC .............. *H04L 9/14* (2013.01); *H04L 9/3263* (2013.01)

(58) Field of Classification Search
CPC ....... H04L 9/14; H04L 9/3263; H04L 9/0894; H04L 9/3226
See application file for complete search history.

(56) References Cited

U.S. PATENT DOCUMENTS 6,553,493 B1 4/2003 Okumura et al.
7,000,108 B1 * 2/2006 Yarsa .................... G06F 21/604 713/153
8,700,903 B2 4/2014 Hsueh et al.
9,330,245 B2 5/2016 Maron
10,277,406 B1 4/2019 Veladanda et al.
10,311,480 B2 6/2019 Singh et al.
10,489,824 B2 11/2019 Vaya et al.
10,559,385 B2 2/2020 Sengupta et al.
10,587,606 B2 3/2020 Moskal
10,607,151 B2 3/2020 Rajan et al.
10,630,489 B2 4/2020 Hughes
10,957,001 B2 3/2021 Edakunni et al.
2008/0005086 A1 1/2008 Moore
2011/0296172 A1 * 12/2011 Fu ......................... H04L 9/3268 713/156
2017/0063812 A1 * 3/2017 Dash ..................... H04L 9/0869
2017/0364956 A1 12/2017 Dhar et al.
(Continued)

*Primary Examiner* — Sangseok Park
(74) *Attorney, Agent, or Firm* — Baratta Law PLLC; Lawrence A. Baratta, Jr.

(57) ABSTRACT

Systems and methods are provided for enhancing or modifying the Public Key Cryptography Standard (PKCS) #12 (P12) file formatting protocol for password-protecting digital certificates. According to one implementation, a method includes a step of receiving a certification request from a client, the certification request including at least a) a selection of a modified Public Key Cryptography Standard (PKCS) #12 (P12) file formatting scheme and b) a user password encrypted with a public key of a first key pair. The method also includes a step of using a private key of the first key pair to decrypt the user password. In addition, the method includes a step of issuing a digital certificate for the client based on the certification request, the digital certificate having a second key pair. Then, the method includes encrypting the digital certificate and user private key using the user password.

20 Claims, 4 Drawing Sheets

(56) References Cited

U.S. PATENT DOCUMENTS

| | | | | |
|---|---|---|---|---|
| 2018/0234408 | A1 | 8/2018 | Bransom et al. | |
| 2020/0341689 | A1* | 10/2020 | Smith | G06F 3/0614 |
| 2024/0022418 | A1* | 1/2024 | Hawkins | G06F 21/62 |
| 2024/0430249 | A1* | 12/2024 | Singh | H04L 43/0817 |
| 2025/0007732 | A1* | 1/2025 | Stapleton | H04L 9/32 |

* cited by examiner

PUBLIC KEY CRYPTOGRAPHY WITH PASSWORD PROTECTION

FIELD OF THE DISCLOSURE

The present disclosure relates generally to cybersecurity and public key cryptography. More particularly, the present disclosure relates to systems and methods for formatting digital certificate information to enable secure storage and delivery, whereby certificate elements can be encrypted using password protection schemes.

BACKGROUND

Digital certificates (e.g., public key certificates, identity certificates, X.509 certificates, etc.) are electronic documents configured to verify the identity or authenticity of users, devices, servers, etc. Digital certificates utilize cryptography and Public Key Infrastructure (PKI) methodologies to secure online communication and can help organizations ensure that only trusted devices and users can connect to their networks. Public Key Cryptography Standard (PKCS) #12, referred to as "PKCS #12" or simply "P12," is defined as a file formatting scheme for storing cryptography objects that can be bundled in a single file. More particularly, P12 formatting includes the use of a password for protecting the bundled certificate or file during storage or delivery.

BRIEF SUMMARY

The present disclosure relates to systems and methods associated with using an enhanced file formatting technique that is essentially a modification of sending Public Key Cryptography Standard #12 (P12) files. The systems and methods perform the Enhanced or Modified P12 file formatting technique, as defined herein, in order to protect digital certificates and passwords more securely. In one implementation, a method includes a step of receiving a certification request from a client. For instance, the certification request includes at least a) a selection of a modified P12 file formatting scheme and b) a User Password encrypted with a public key of a first key pair. In addition, the method includes a step of using a private key of the first key pair to decrypt the User Password. The method also includes a step of issuing a digital certificate for the client based on the certification request, wherein the digital certificate includes a second key pair. Furthermore, the method includes a step of encrypting the digital certificate and user private key using the User Password.

In some embodiments, the method may further include a step of maintaining the User Password in transient memory while avoiding persistence of the User Password in data storage, logs, or long-term memory. Subsequent to encrypting the digital certificate and user private key using the User Password, the method may then include a step of deleting the User Password. Also, the method may further include a step of creating a bundle according to the modified P12 file formatting scheme to combine an indicator with the digital certificate encrypted using the User Password. For example, the indicator may be configured to indicate to the client that the User Password has been securely transmitted and stored and that the User Password has been removed from memory resources in order to avoid a security risk associated with password handling procedures.

According to various implementations, the method may also include one of a) a step of transmitting the digital certificate to the client and b) a step of making the digital certificate available to the client via an online download procedure. The method may also include a step of informing the client that the digital certificate and a private key of the second key pair can be decrypted using the User Password. The step of issuing the certificate, for example, may include steps of a) generating the digital certificate to include the second key pair and b) signing the digital certificate using the private key of the first key pair.

In some embodiments, the method may be performed by a Certificate Authority (CA), where the first key pair is associated with the CA. Prior to the step of receiving the certification request, the method may further include a step of providing the public key of the first key pair to the client to enable the client to encrypt the User Password. The method may also include a step of enabling the client to a) fill out an enrollment page and b) encrypt the User Password using the public key of the first key pair, wherein filling out the enrollment page includes 1) entering a user name and/or client name, 2) entering the selection of the modified P12 file formatting scheme, and 3) entering the User Password.

BRIEF DESCRIPTION OF THE DRAWINGS

The present disclosure is detailed through various drawings, where like components or steps are indicated by identical reference numbers for clarity and consistency.

DETAILED DESCRIPTION

Figure 1:
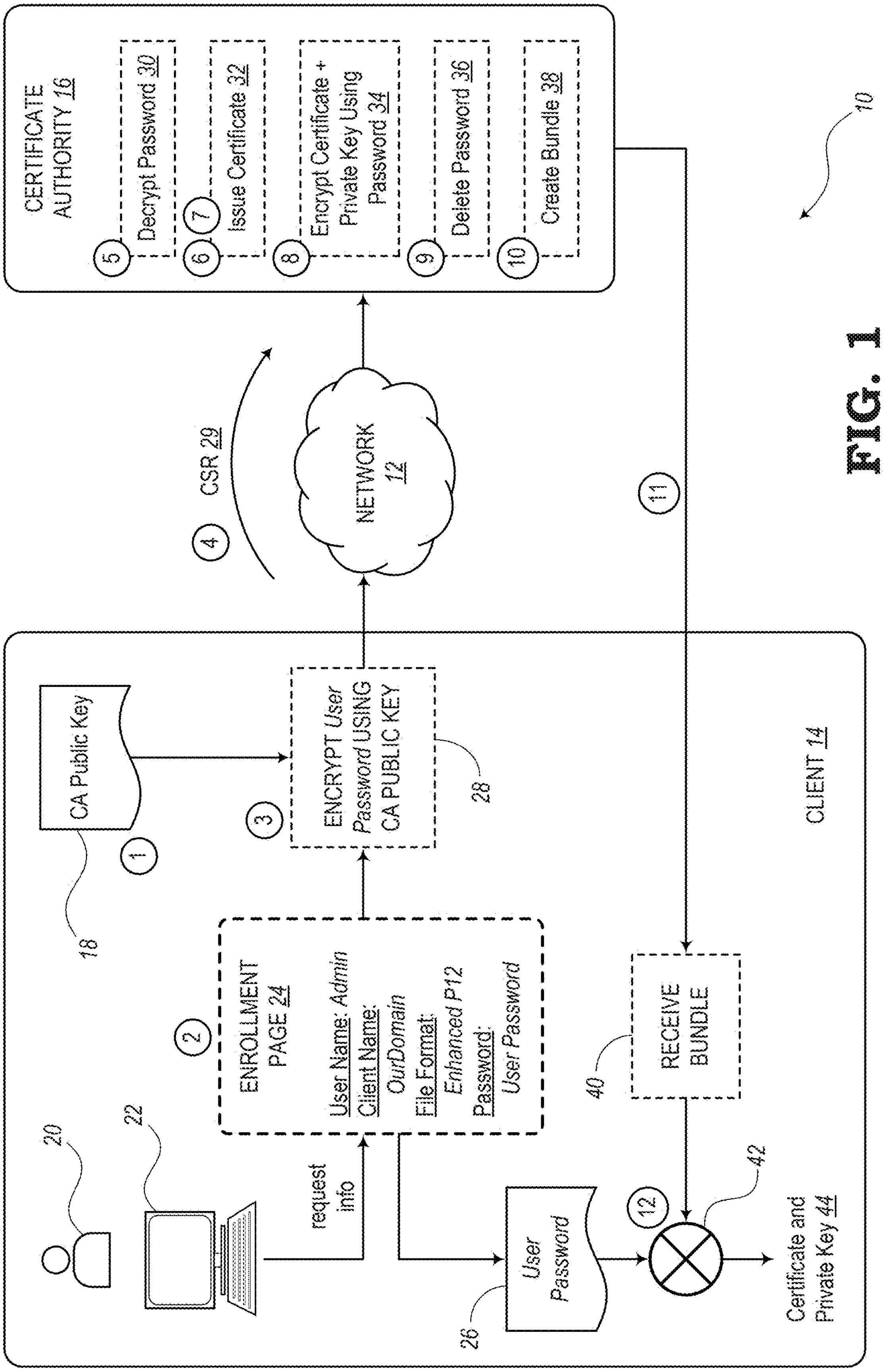
FIG. 1 is a diagram illustrating a certification system allowing a Certificate Authority (CA) to issues digital certificates to clients, according to various embodiments.

Again, PKCS #12 (or P12) formatting includes a storage and delivery protocol where cryptographic objects of a certificate are configured as a bundled file that is protected with a password. The certificate, as described herein, may refer to a digital certificate, digital identity certificate, International Telecommunication Union (ITU) X.509 standard certificate, Secure Sockets Layer (SSL) certificate, Transport Layer Security (TLS) certificate, SSL/TLS certificate, HTTPS certificate, etc. The certificate may have any suitable level of security, such as a Domain Validated (DV) certificate, Organization Validated (OV) certificate, Extended Validation (EV) certificate, etc.

The bundled file created using the P12 protocol may include an "archive file formatting" scheme. That is, the bundled file may include a) client information, b) a certification request (i.e., a Certificate Signing Request (CSR)), c) a request to enact the novel Enhanced (or Modified) P12 file formatting protocol (as defined herein), d) a password, e) metadata, f) compressed files, and/or other information and data. The P12 file, which may include internal storage containers (e.g., "SafeBags"), may be encrypted and signed. The conventional P12 protocol is one of a family of standards of the Public-Key Cryptography Standards (PKCSs). The bundled file may use a file extension of .p12 or .pfx.

The P12 protocol securely stores both public and private keys and is considered to be one of the safest ways to deliver key pairs to end users. P12 files are password-protected and encrypted before being sent to the end user. A Certificate Authority (CA) usually issues and signs a digital certificate and then generates a password, which is used to password-protect the certificate. The CA sends the encrypted digital certificate to the end user in a first step and subsequently sends the password via email or another method to the end user in a second step. The separation of these transmissions is intended to offer a certain level of security. With the password, the user can then unlock the P12 file to retrieve and use the certificate. The challenge, however, lies in safely and promptly delivering this password to the end user. The embodiments of the present disclosure are configured to address and resolve this password delivery challenge completely.

A P12 certificate (or PKCS #12 certificate) involves a file format used to bundle a private key with its associated public key certificate in a single, encrypted file. This format is commonly employed for securely transferring cryptographic keys and certificates between systems or applications. Because the P12 file contains sensitive information (e.g., the private key), it is protected with a password. This password encrypts the contents of the file, ensuring that only authorized individuals who know the password can access and use the private key and certificate within.

The delivery of a P12 certificate with a password adds a layer of security during transmission or storage. When the P12 file is shared, the accompanying password must also be communicated to the recipient to enable them to decrypt and use the certificate. However, this introduces security risks associated with the password itself. If the password is weak, easily guessable, or transmitted insecurely (e.g., through an unencrypted email), it can be intercepted or cracked by unauthorized parties. This could lead to the compromise of the private key, allowing attackers to impersonate the certificate holder, decrypt sensitive communications, or gain unauthorized access to systems and data. Thus, a problem with the conventional methodology is that the CA generates the password and sends it to the end user via email or another method, but the password itself may have minimal encryption and can therefore be exposed to hacking or phishing attempts.

Hence, a normal flow of P12 formatting may include:

(1) The CA generates a key pair for inclusion into P12 and a password;

(2) The CA sends the password-protected P12 to the user; and (3) The CA sends the password separately, which can introduce security issues.

Essentially, one problem is that too much trust must be put on the CA regarding the storage, handling, and transport of the password.

Therefore, according to the systems and methods described in the present disclosure, end users (e.g., clients) can now choose their own password and determine its complexity for their P12 certificate file, thereby ensuring greater security and enabling the end user to control of their own security level. In the process of creating a password, the CA is not involved, thereby eliminating any possibility of password compromise on the CA's side. The user encrypts their chosen password with a public key of a key pair associated with the CA. Therefore, the password itself is encrypted (using the public key) and the encrypted password is included in the client's certification request (e.g., Certificate Signing Request (CSR)) that is sent to the CA. Upon decrypting the password using the CA's private key of the key pair, the CA can then generate a certificate (with its public and private keys), signs the certificate, and encrypt both the certificate and private key using the password that was originally provided by the user. The encrypted certificate and private key are then sent to the end user or made available for download. The end user can open the P12 file using their own password, boosting their confidence that the password has not been disclosed to anyone.

Certification System

FIG. 1 is a diagram illustrating an embodiment of a certification system 10 that may be deployed for use in a communication system (e.g., the Internet) where communication may be enabled over a network 12. A client 14 (among multiple possible clients) may communicate via the network 12 with a Certificate Authority (CA) 16 (e.g., DigiCert), which can issue digital certificates to the clients. The client 14 may be a domain, enterprise, organization, university, etc. It should be noted that FIG. 1 is shown in a simplified manner to emphasize the general concepts of the systems and methods for allowing an Enhanced (or Modified) P12 file formatting scheme for storing and delivering digital certificates in the certification system 10.

Generally, the client 14 includes a copy of a public key 18 associated with the CA 16. An end user 20 (e.g., admin, network operator, etc.) of the client 14 may use a user device 22 (e.g., computer, laptop, tablet, mobile phone, etc.) for providing request information to fill out an enrollment page 24 to request a certificate from the CA 16. One part of entering the request information into the enrollment page 24, for example, includes entering a User Password 26. The User Password 26 may be stored with the client 14 in any suitable memory or database and can be used at a later time, as is described below.

When the enrollment page 24 is complete, the client 14 is configured to perform an encryption step 28 for encrypting the User Password 26 using the public key 18. Then, the client 14 can send a CSR 29 to the CA 16, where the CSR 29 may include information associated with the enrollment page 24, such as the user name (e.g., Admin), the client name (e.g., OurDomain), a certification file formatting selection (e.g., the Enhanced P12 formatting scheme described herein), and password (e.g., User Password 26). It should be noted that at least the User Password 26 delivered in the CSR 29 is encrypted (e.g., using the public key 18). In some embodiments, other portions of the CSR 29 may also be encrypted using the public key 18. Furthermore, according to various embodiments, the CA 16 may be configured to download the public key 18 to the client 14 (or clients) and may further download software/firmware and/or other functionality to enable the client 14 (or clients) to enter information via the enrollment page 24, perform the encryption step 28 to encrypt the password, and/or additional functionality associated with the Enhanced P12 file formatting scheme for storing and delivering certificates.

Upon receiving the CSR 29, the CA 16 is configured to process the CSR 29, which may begin with noting that the client 14 has requested that a certificate is issued and encrypted using the password-protection related to the Enhanced P12 scheme described herein. It should be noted that the CA 16 may include any suitable combination of computing resources, servers, databases, etc. for providing clients with certification issuing services, particularly services related to the Enhanced P12 scheme.

With specific reference to Enhanced P12 formatting, the CA 16 is configured to decrypt 30 the User Password using a private key of a specific key pair, whereby the key pair includes both this private key along with the public key 18 which is shared with the clients for enabling password encryption. Next, the CA 16 is configured to issue 32 a certificate (e.g., digital certificate, X.509 certificate, etc.), which may include generating a certificate (with a second key pair having another private key and public key) and then signing the certificate. Also, the CA 16 is configured to encrypt 34 the certificate using the User Password. Next, the CA 16 is configured to delete 36 the password. Then, the CA 16 creates 38 a bundle or envelope using the Enhanced P12 scheme, including user certificate and private key that has been encrypted with the User Password.

After bundling, the CA 16 is configured to send the bundle via the network 12 to the client 14, where the certificate can be safety transmitted since it is encrypted with the User Password. The client 14 receives 40 the bundle and is able to obtain the certificate using a decryption function 42 that uses the User Password 26 for decrypting the bundle and/or certificate. Thus, the client 14 can safely and securely retrieve the certificate and private key 44.

Enhanced P12 Formatting Process

Figure 2:
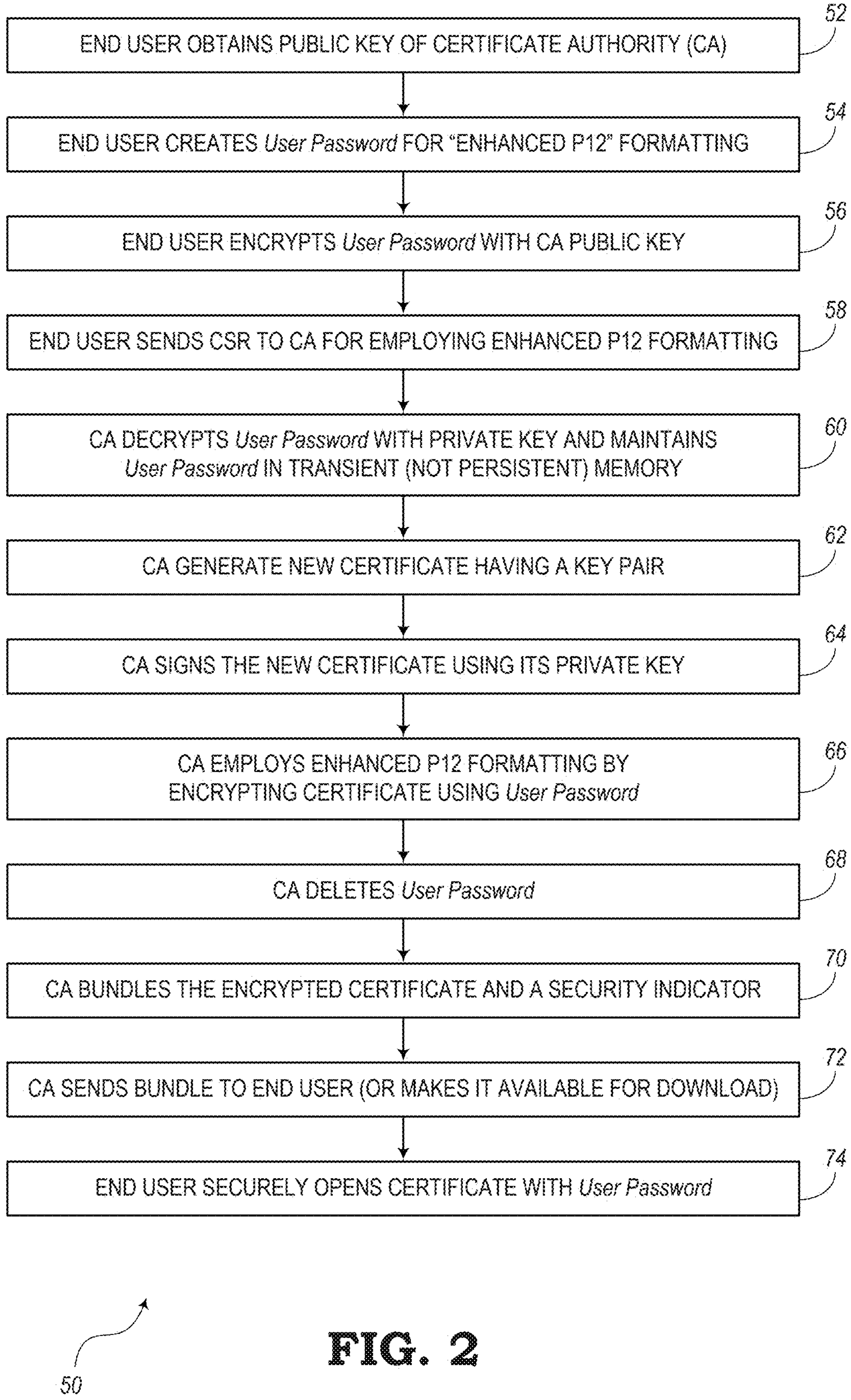
FIG. 2 is a flow diagram illustrating a method of employing an enhanced password-protection formatting scheme for digital certificates, according to various embodiments of the present disclosure.

FIG. 2 is a flow diagram illustrating an embodiment of a method 50 of employing an enhanced password-protection formatting scheme (e.g., Enhanced P12) that can be used for the storage and delivered of digital certificates. The method 50 includes steps that correspond with the circled numbers shown in FIG. 1. In this embodiments, the method 50 includes a first step (block 52) where an end user (e.g., client) obtains the public key associated with the CA. The method 50 includes a second step (block 54) where the end user creates a password (e.g., User Password 26) that is used specifically for the Enhanced P12 file formatting scheme. Also, the method 50 includes a third step (block 56) where the end user encrypts the User Password 26 with the CA public key. Then, the end user is configured to perform a fourth step (block 58) of sending a CSR to the CA for employing the Enhanced P12 formatting.

In addition, the method 50 includes a fifth step (block 60) where the CA decrypts the User Password with its private key and maintains the User Password in transient (not persistent) memory. This is also done for security purposes to give assurance to the clients that their passwords will not be stored in a third party system, even a trusted entity like the CA 16. Transient memory (e.g., transient storage component 96 described below) may refer to any short-term or erasable memory, such as transitory, ephemeral, temporary, passing, momentary, brief, fleeting, and/or evanescent memory. In this sense, the transient memory may include storage that only lasts or stays for a short time. Transient or transitory memory may apply to storage that is short in its duration or, by its nature or essence, is bound to change, pass, come to an end, be re-written, be over-written, etc.

Next, the method 50 includes a sixth step (block 62) where the CA generates a new certificate having a key pair (i.e., private key and public key) for the end user. The method 50 also includes a seventh step (block 64) where the CA signs the new certificate using its private key. The method 50 further includes an eighth step (block 66) where the CA employes the Enhanced P12 formatting by encrypting the certificate and user private key using the User Password. Then, the method 50 includes a ninth step (block 68) where the CA deletes the User Password from the transient memory. Again, it should be noted that the password is never held in persistent memory, which may be subjected to attacks.

Furthermore, the method 50 includes a tenth step (block 70) where the CA bundles the encrypted certificate and a security indicator. For example, the security indicator may be an indication that informs the end user that the User Password has not be stored in persistent memory. The security indicator may further inform the end user that, during transport of the CSR, the User Password was encrypted with a key that can only be unlocked by the CA itself (using the corresponding private key). Also, the security indicator may inform the end user that the transport of the certificate to the client is performed with the certificate encrypted with the user's own password. The security indicator may be used simply to reassure the client that cyber security has been employed at every turn. The method 50 includes an eleventh step (block 72) where the CA (securely) sends the bundle to the end user and/or makes the bundle available to the end user by an online downloading process, instructions of which can be included in the bundle. When the end user receives the bundle, the method 50 includes a twelfth step (block 74) where the end user can securely open the certificate using their own password (i.e., User Password 26).

Thus, the process flow may include

Step #1—Public key of CA is made available to end user who wants to employ the novel P12 formatting methodology described herein for receiving a certificate for a domain associated with the end user Step #2—End User 20 (using the user device 22) creates the User Password 26 (created with any level of complexity as desired) to be used with the novel P12 formatting methodology (as opposed to the conventional P12 standard), wherein the user password is created with no involvement whatsoever by the CA Step #3—End User encrypts (at least) the User Password 26 with the CA public key 18. The end user does not simply send the password over the network 12 (in an exposed manner) or enter it on a secure website or over a secure tunnel, but rather the end user encrypts the password with the CA's public key and the CA can decrypt the password with its private key. The P12 processing can use the password to protect the request (e.g., CSR 29) and the certificate bundle.

Step #4—End User sends the CSR 29 (or certification request) to the CA 16 in order to request or apply for a digital certificate for verifying or authenticating the identity of the client, end user, devices, etc. The CSR 29 is related to a request to specifically employ the novel P12 formatting methodology, the request including the end user's name, domain name, encrypted user password, etc. All or parts of the CSR 29 may be encrypted, according to various implementations.

Step #5—CA decrypts the user password (and other encrypted components) with its own private key (which is associated with the CA public key 18 downloaded to the End User in Step #1), whereby the CA maintains the user password in transient or transitory memory, but not in data storage, logs, or long-term memory. That is, according to the Enhance or Modified P12 scheme, the CA does not persist the password to memory or save the password in any way that can be exposed to external threats. Instead, the CA uses transitory memory (e.g., in a software setting) for protecting the information during processing and prior to transmission

- Step #6—CA generates a new certificate for the end user, the new certificate having a key pair with public and private keys
- Step #7—CA signs the new certificate using its private key (to create a digital signature that verifies the authenticity and integrity of the new certificate)
- Step #8—CA employs the novel P12 formatting methodology by encrypting the certificate and private key using the user password, thereby password-protecting the certificate
- Step #9—CA permanently deletes the user password
- Step #10—CA bundles (or generates an envelope of) the encrypted certificate (and private key) and an indicator. The bundling may use conventional P12 steps other suitable bundling standards or protocols. The indicator may indicate to the end user that the password has been encrypted before any transmission and has already been removed from all memory resources associated with the CA and is not a security risk.
- Step #11—CA sends the P12 bundled certificate (with private key) to the end user (or makes it available via download)
- Step #12—End User can open the certificate using the (secure) User Password 26 (created in Step #2). The End User can have assurance that the password has been encrypted before being transmitted, has not been disclosed to any third party, and is not stored long-term memory of any system, including the CA's system.

Certificate Authority (CA)

Figure 3:
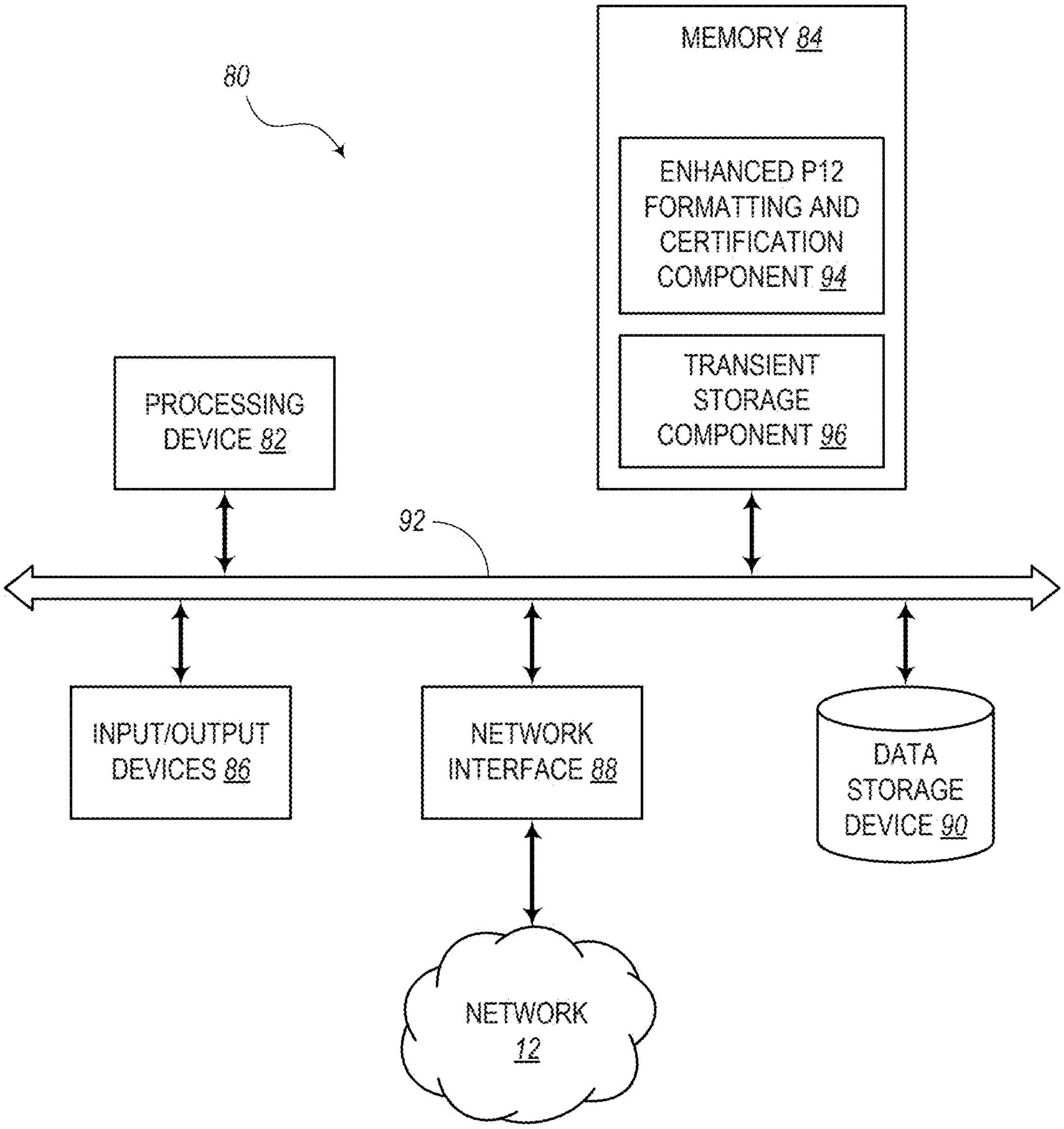
FIG. 3 is a block diagram illustrating a computing device associated with the CA, according to various embodiments.

FIG. 3 is a block diagram illustrating an embodiment of a computing system 80 associated with the CA 16. The computing system 80 may be a digital computer that, in terms of hardware architecture, generally includes a processing device 82, a memory 84, input/output (I/O) devices 86, a network interface 88, and a data storage device 90. It should be appreciated by those of ordinary skill in the art that FIG. 3 depicts the computing system 80 in an oversimplified manner, and a practical embodiment may include additional components and suitably configured processing logic to support known or conventional operating features that are not described in detail herein. The components (82, 84, 86, 88, 90) are communicatively coupled via a local interface 92. The local interface 92 may be, for example, but not limited to, one or more buses or other wired or wireless connections, as is known in the art. The local interface 92 may have additional elements, which are omitted for simplicity, such as controllers, buffers (caches), drivers, repeaters, and receivers, among many others, to enable communications. Further, the local interface 92 may include address, control, and/or data connections to enable appropriate communications among the aforementioned components.

The processing device 82 is a hardware device for executing software instructions. The processing device 82 may be any custom made or commercially available processor, a Central Processing Unit (CPU), an auxiliary processor among several processors associated with the computing system 80, a semiconductor-based microprocessor (in the form of a microchip or chipset), or generally any device for executing software instructions. When the computing system 80 is in operation, the processing device 82 is configured to execute software stored within the memory 84, to communicate data to and from the memory 84, and to generally control operations of the computing system 80 pursuant to the software instructions. The I/O devices 86 may be used to receive user input from and/or for providing system output to one or more devices or components.

The network interface 88 may be used to enable the computing system 80 to communicate on a network, such as the Internet. The network interface 88 may include, for example, an Ethernet card or adapter or a Wireless Local Area Network (WLAN) card or adapter. The network interface 88 may include address, control, and/or data connections to enable appropriate communications on the network. A data storage device 90 (e.g., one or more databases, data stores, etc.) may be used to store data. The data storage device 90 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data storage device 90 may incorporate electronic, magnetic, optical, and/or other types of storage media. In one example, the data storage device 90 may be located internal to the computing system 80, such as, for example, an internal hard drive connected to the local interface 92 in the computing system 80. Additionally, in another embodiment, the data storage device 90 may be located external to the computing system 80 such as, for example, an external hard drive connected to the I/O devices 86 (e.g., SCSI or USB connection). In a further embodiment, the data storage device 90 may be connected to the computing system 80 through the network 12, such as, for example, a network-attached file server.

The memory 84 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 84 may incorporate electronic, magnetic, optical, and/or other types of storage media. Note that the memory 84 may have a distributed architecture, where various components are situated remotely from one another but can be accessed by the processing device 82. The software in memory 84 may include one or more software programs, each of which includes an ordered listing of executable instructions for implementing logical functions. The software in the memory 84 includes a suitable Operating System (O/S) and one or more programs. The O/S essentially controls the execution of other computer programs, such as the one or more programs, and provides scheduling, input-output control, file and data management, memory management, and communication control and related services. The one or more programs may be configured to implement the various processes, algorithms, methods, techniques, etc. described herein.

The computing system 80 further includes an Enhanced P12 formatting and certification component 94 (or program) and a transient storage component 96. The transient storage component 96 may be configured to enable the use of the User Password during processing of the digital certificate. In some embodiments, the transient storage component 96 may be configured to perform automatic (e.g., periodic, regular, etc.) erasing/purging functions for removing contents thereof. The Enhanced P12 formatting and certification component 94 may be implemented in any suitable combination of hardware (e.g., configured in the processing device 82) and/or software/firmware (e.g., configured in the memory 84). The Enhanced P12 formatting and certification component 94 may be stored in any suitable non-transitory computer-readable media (e.g., the memory 84) and may include computer logic or code having instructions that enable or cause the processing device 82 to perform certain actions as discussed in the present disclosure.

Of note, the general architecture of the computing system 80 can define any device described herein. However, the computing system 80 is merely presented as an example architecture for illustration purposes. Other physical embodiments are contemplated, including virtual machines (VM), software containers, appliances, network devices, and the like.

In an embodiment, the various techniques described herein can be implemented via a cloud service. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

General Method

Figure 4:
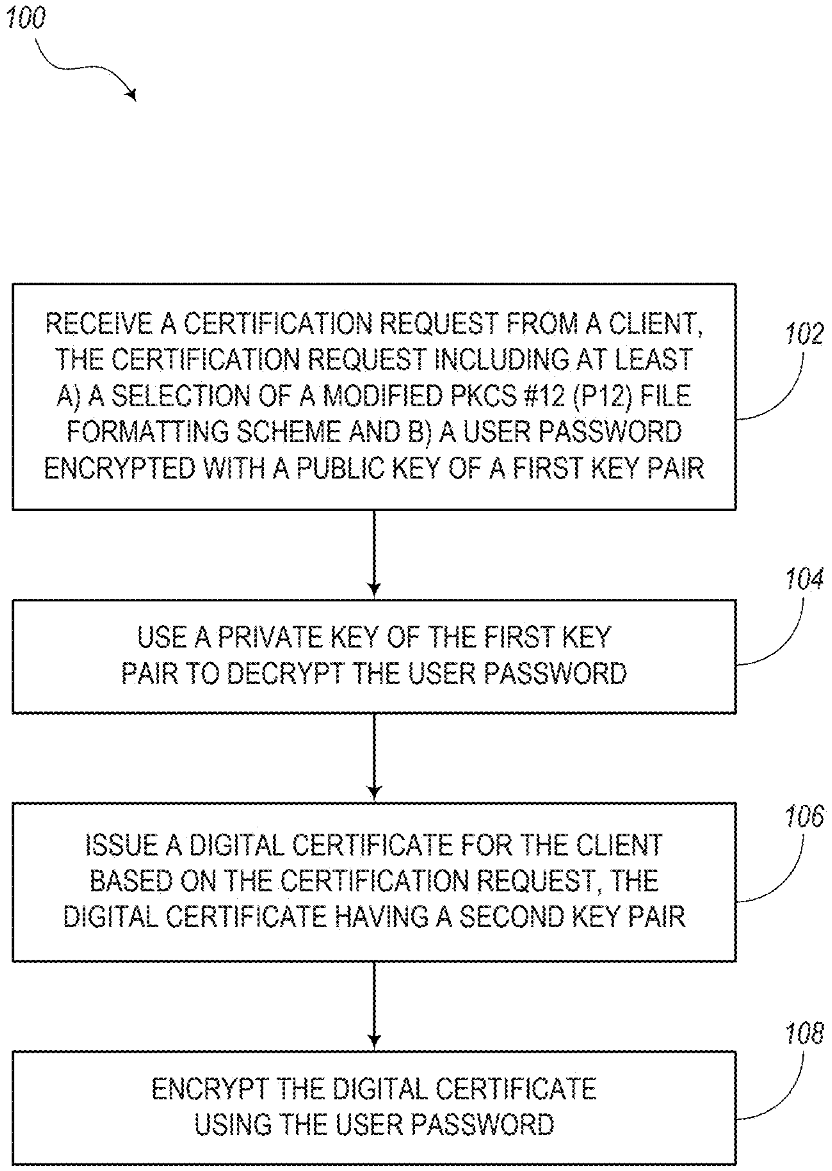
FIG. 4 is a flow diagram illustrating a method of performing an Enhanced or Modified Public Key Cryptography Standard (PKCS) #12 (PKCS #12 or "P12") formatting technique for securing digital certificates, according to various embodiments of the present disclosure.

FIG. 4 is a flow diagram illustrating an embodiment of a method 100 of performing an Enhanced (or Modified) P12 file formatting technique for securing digital certificates. In this embodiment, the method 100 includes a step of receiving a certification request from a client, as indicated in block 102. For instance, the certification request includes at least a) a selection of a modified P12 file formatting scheme and b) a user password encrypted with a public key of a first key pair. In addition, the method 100 includes a step of using a private key of the first key pair to decrypt the user password, as indicated in block, 104. The method 100 also includes a step of issuing a digital certificate for the client based on the certification request, as indicated in block 106, wherein the digital certificate includes a second key pair. Furthermore, the method 100 includes a step of encrypting the digital certificate and user private key using the user password, as indicated in block 108.

In some embodiments, the method 100 may further include a step of maintaining the user password in transient memory while avoiding persistence of the user password in data storage, logs, or long-term memory. Subsequent to encrypting the digital certificate and user private key using the user password, the method 100 may then include a step of deleting the user password. Also, the method 100 may further include a step of creating a bundle according to the modified P12 file formatting scheme to combine an indicator with the digital certificate encrypted using the user password. For example, the indicator may be configured to indicate to the client that the user password has been securely transmitted and stored, and that the user password has been removed from memory resources in order to avoid a security risk associated with password handling procedures.

According to various implementations, the method 100 may also include one of a) a step of transmitting the digital certificate to the client and b) a step of making the digital certificate available to the client via an online download procedure. The method 100 may also include a step of informing the client that the digital certificate and a private key of the second key pair can be decrypted using the user password. The step of issuing the certificate, for example, may include steps of a) generating the digital certificate to include the second key pair and b) signing the digital certificate using the private key of the first key pair.

In some embodiments, the method 100 may be performed by a Certificate Authority (CA), where the first key pair is associated with the CA. Prior to the step of receiving the certification request, the method 100 may further include a step of providing the public key of the first key pair to the client to enable the client to encrypt the user password. The method 100 may also include a step of enabling the client to a) fill out an enrollment page and b) encrypt the user password using the public key of the first key pair, wherein filling out the enrollment page includes 1) entering a user name and/or client name, 2) entering the selection of the modified P12 file formatting scheme, and 3) entering the user password.

Advantages of Enhanced P12 Over Conventional P12

Delivering a password for a P12 certificate in conventional systems introduces security risks because the password serves as the key to unlock sensitive information within the certificate (specifically, the private key). If the password is compromised during delivery, an unauthorized party could gain access to the private key, undermining the entire security mechanism that the P12 certificate is supposed to provide. The following includes how the delivery of the password can introduce security risks:

1. Interception During Transmission: When the password is sent over insecure channels (e.g., unencrypted email, SMS, standard messaging apps, etc.), it can be intercepted by malicious actors monitoring network traffic. Even if the P12 file is securely transmitted, an intercepted password may render the security moot, as the attacker can use the password to decrypt the P12 file if they obtain it.
2. Insecure Storage: If the password is stored insecurely during or after delivery (e.g., written on a piece of paper, saved in an unencrypted file, stored in a compromised password manager, etc.), it can be accessed by unauthorized individuals who might have physical or digital access to that storage medium.
3. Social Engineering Attacks: Attackers may employ phishing or other social engineering tactics to trick individuals into revealing the password. For instance, an attacker might impersonate a trusted colleague or authority figure and request the password via email or phone.
4. Reuse of Passwords: If the same password is used for multiple certificates or accounts, the compromise of one password can lead to broader security breaches. An attacker who obtains the password could potentially access other systems or data protected by the same password. Even some CAs may use predictable password generation techniques that might be learned by a hacker.
5. Lack of Secure Verification: Without proper verification methods, the password might be delivered to the wrong person. For example, sending the password to an incorrect email address due to a typo can result in unintended recipients gaining access.
6. Man-in-the-Middle Attacks: During the delivery process, attackers might intercept communications between the sender and the recipient without either party's knowledge. They can then steal or alter the password during transit.

7. Delayed or Unsecured Delivery: If there is a delay between the delivery of the P12 file and the password, or if the password is delivered over a less secure channel than the P12 file, it creates a window of opportunity for attackers to exploit.

A P12 certificate may be included in a binary format for storing cryptographic objects (e.g., private keys, certificates, certificate chains, etc.). One purpose of using a P12 file is to bundle a private key with its corresponding public key certificate, facilitating secure storage and transfer.

A Password Protection Mechanism may include the following:

1. Encryption of Private Key
   - Symmetric Encryption: The private key within the P12 file may be encrypted using a symmetric encryption algorithm. Common algorithms include Triple DES (3DES) or AES (Advanced Encryption Standard).
   - Password-Derived Key: The encryption key may be derived from the password provided by the user using a Key Derivation Function (KDF) such as Password-Based Key Derivation Function 2 (PBKDF2). The KDF applies a cryptographic hash function multiple times to the password along with a salt value to produce a strong encryption key.
   - Confidentiality: Encrypting the private key ensures that even if the P12 file is intercepted or accessed by unauthorized parties, they cannot extract the private key without knowing the correct password.
2. Integrity Protection
   - Message Authentication Code or authentication tag: This code (or tag) is computed over the contents of the P12 file using the password. This ensures that any tampering with the file can be detected because the code verification will fail if the contents have been altered.
   - Password Verification: The password is also used to verify that the correct password has been entered when attempting to access the file. If the password does not match, decryption and MAC verification may likely fail.
3. Encryption of Entire File (Optional)
   - Full File Encryption: In some cases, not only the private key but the entire P12 file (e.g., certificates, key pair, metadata) may be encrypted using the password. This adds an extra layer of security by protecting all the contents of the file.

A process of protecting a P12 certificate with a password may include:

1. Creation
   - When generating a P12 file, the user (or the system generating it) may be configured to specify a password, according to the embodiments of the systems and methods of the present disclosure.
   - The private key may be encrypted using the password-derived key.
   - Certificates (public keys) are usually not encrypted since they are meant to be public, but they can be included in the encrypted portion for added security.
2. Storage and Transfer
   - The encrypted P12 file can be safely stored on disk or transmitted over networks because the sensitive private key is protected by the password-based encryption.
   - Unauthorized parties cannot access the private key without the password, maintaining the confidentiality of the key.
3. Access and Usage
   - To use the P12 file (e.g., to establish a secure SSL/TLS connection or to sign documents), the end user can then use their own password, such as User Password 26, as suggested in Step #12. The client 14 can securely store the created password to allow the encryption function 42 to utilize the User Password 26 as needed to obtain the certificate and private key 44.
   - The application or system reads the P12 file, prompts for the password, and uses it to decrypt the private key.
   - Once decrypted, the private key can be used for cryptographic operations, and the associated certificates can be used to establish trust.

Security Considerations
   - Strength of the Password: The security of the encrypted private key heavily depends on the strength of the password. A weak or easily guessable password can be brute-forced or cracked, compromising the private key.
   - Password Management: Users must securely manage and store their passwords. If the password is lost, the encrypted private key cannot be recovered. If it is compromised, unauthorized parties can access the private key.
   - Algorithm Selection: The choice of encryption algorithms and KDF parameters (like iteration count) affects the security. Strong algorithms and adequate parameters make it more resistant to attacks.

Advantages of Password Protection
   - Confidentiality: Ensures that the private key remains confidential even if the P12 file is exposed.
   - Secure Transfer: Facilitates safe transmission of private keys and certificates over insecure networks.
   - Compliance: Meets security standards and regulatory requirements for protecting sensitive cryptographic material. Additionally, when complying with the Enhanced P12 file formatting techniques described herein, further protection of the sensitive information can be offered.

Letting a user (e.g., end user 20, admin) select the password for their P12 certificate separately from the CA, as described in the present disclosure, enhances security for several reasons:

1. Exclusive Knowledge of the Password: When the user creates the password, only they know it. This ensures that the password is not exposed to any third parties, including the CA. If the CA sets the password, there may be a risk that it could be intercepted or misused by unauthorized personnel within or outside the CA organization.
2. Elimination of Transmission Risks: If the CA assigns the password, it must be communicated to the user, typically over a network or via email. This transmission introduces security risks, as the password could be intercepted by malicious actors during transit. By allowing the user to set the password, there is no need to transmit it, effectively removing this vulnerability.
3. Mitigation of Insider Threats: Even in trusted organizations, insider threats pose a significant risk. Employees with access to password information might misuse it intentionally or unintentionally. By not having the CA know the password, the risk of insider threats compromising the private key is reduced.
4. Alignment with Security Best Practices: Security principles advocate that private keys and passwords should remain confidential to the owner. Allowing users to generate their own passwords adheres to the principle of least privilege and minimizes the number of entities with access to sensitive information.

5. User-Controlled Password Strength: Users can create strong, unique passwords that meet their personal or organizational security standards. They can use password managers or follow specific complexity requirements, enhancing the overall security compared to a generic password that might be provided by the CA.
6. Avoidance of Default or Weak Passwords: If the CA provides the password, there is a possibility it could be a default or commonly used password, which might be weak or easily guessable. User-generated passwords are less likely to fall into this category, especially if users are educated about creating strong passwords.
7. Compliance with Regulatory Requirements: Certain industries and regulations require that private keys and associated passwords are generated and controlled solely by the end-user to maintain compliance. Allowing users to set their own passwords helps meet these regulatory standards.
8. Reduced Risk of Password Reuse: Users who set their own passwords are more likely to use unique passwords rather than reusing one provided by the CA across multiple systems, which can be a significant security risk if one system is compromised.
9. Enhanced Trust in the Security Process: Users may have greater confidence in the security of their private keys when they know that no external party has ever had access to their password. This trust is crucial for maintaining secure cryptographic practices.

By enabling users to select their own passwords for P12 certificates, risk of unauthorized access can be minimized or reduced, the risk being due to password compromise at the CA level or during password transmission. This approach ensures that the password (and thus the private key within the P12 certificate) remains confidential to the user alone. It eliminates potential vulnerabilities associated with password handling by third parties and aligns with best practices in security and regulatory compliance. Overall, user-selected passwords significantly strengthen the security of the certificate management process by keeping critical authentication factors exclusively under the user's control.

CONCLUSION

In this disclosure, including the claims, the phrases "at least one of" or "one or more of" when referring to a list of items mean any combination of those items, including any single item. For example, the expressions "at least one of A, B, or C," "at least one of A, B, and C," "one or more of A, B, or C," and "one or more of A, B, and C" cover the possibilities of: only A, only B, only C, a combination of A and B, A and C, B and C, and the combination of A, B, and C. This can include more or fewer elements than just A, B, and C. Additionally, the terms "comprise," "comprises," "comprising," "include," "includes," and "including" are intended to be open-ended and non-limiting. These terms specify essential elements or steps but do not exclude additional elements or steps, even when a claim or series of claims includes more than one of these terms.

Although operations, steps, instructions, blocks, and similar elements (collectively referred to as "steps") are shown in the drawings, descriptions, and claims in a specific order, this does not imply they must be performed in that sequence unless explicitly stated. It also does not imply that all depicted operations are necessary to achieve desirable results. The drawings may schematically represent example processes as flowcharts or diagrams, and additional operations not shown can be included. In the drawings, descriptions, and claims, extra steps can occur before, after, simultaneously with, or between any of the illustrated, described, or claimed steps. Multitasking and parallel processing are also contemplated. Furthermore, the separation of system components or steps described should not be interpreted as mandatory for all implementations; also, components, steps, elements, etc. can be integrated into a single implementation or distributed across multiple implementations.

While this disclosure has been detailed and illustrated through specific embodiments and examples, it should be understood by those skilled in the art that numerous variations and modifications can perform equivalent functions or achieve comparable results. Such alternative embodiments and variations, even if not explicitly mentioned but that achieve the objectives and adhere to the principles disclosed herein, fall within the spirit and scope of this disclosure. Accordingly, they are envisioned and encompassed by this disclosure and are intended to be protected under the associated claims. In other words, the present disclosure anticipates combinations and permutations of the described elements, operations, steps, methods, processes, algorithms, functions, techniques, modules, circuits, and so on, in any conceivable manner—whether collectively, in subsets, or individually—thereby broadening the range of potential embodiments.

What is claimed is:

1. A method comprising steps of:

receiving a certification request from a client, the certification request including at least a) a selection of a modified Public Key Cryptography Standard (PKCS) #12 (P12) file formatting scheme and b) a user password encrypted with a public key of a first key pair;

using a private key of the first key pair to decrypt the user password;

issuing a digital certificate for the client based on the certification request, the digital certificate having a second key pair; and encrypting the digital certificate and a user private key using the user password; and creating a bundle according to the modified P12 file formatting scheme to combine an indicator with the digital certificate encrypted using the user password, wherein the indicator is configured to indicate to the client that the user password has been securely transmitted and stored and that the user password has been removed from memory resources in order to avoid a security risk associated with password handling procedures.

2. The method of claim 1, further comprising a step of maintaining the user password in transient memory while avoiding persistence of the user password in data storage, logs, or long-term memory.

3. The method of claim 2, wherein, subsequent to encrypting the digital certificate and user private key using the user password, the method further includes a step of deleting the user password.

4. The method of claim 1, further comprising one of a) a step of transmitting the digital certificate to the client and b) a step of making the digital certificate available to the client via an online download procedure.

5. The method of claim 4, further comprising a step of informing the client that the digital certificate and a private key of the second key pair can be decrypted using the user password.

6. The method of claim 1, wherein the step of issuing the digital certificate includes steps of a) generating the digital certificate to include the second key pair and b) signing the digital certificate using the private key of the first key pair.

7. The method of claim 1, wherein the method is performed by a Certificate Authority (CA), and wherein the first key pair is associated with the CA.

8. The method of claim 1, wherein, prior to the step of receiving the certification request, the method comprises a step of providing the public key of the first key pair to the client to enable the client to encrypt the user password.

9. The method of claim 8, further comprising a step of enabling the client to a) fill out an enrollment page and b) encrypt the user password using the public key of the first key pair, wherein filling out the enrollment page includes 1) entering a user name and/or client name, 2) entering the selection of the modified P12 file formatting scheme, and 3) entering the user password.

10. A computing system associated with a Certificate Authority (CA), the computing system comprising:
- a processing device; and
- memory configured to store computer-readable code having instructions that, when executed, enable the processing device to perform steps of
  - receiving a certification request from a client, the certification request including at least a) a selection of a modified Public Key Cryptography Standard (PKCS) #12 (P12) file formatting scheme and b) a user password encrypted with a public key of a first key pair,
  - using a private key of the first key pair to decrypt the user password,
  - issuing a digital certificate for the client based on the certification request, the digital certificate having a second key pair,
  - encrypting the digital certificate and a user private key using the user password, and
  - create a bundle according to the modified P12 file formatting scheme to combine an indicator with the digital certificate encrypted using the user password, the indicator configured to indicate to the client that the user password has been securely transmitted and stored and that the user password has been removed from memory resources in order to avoid a security risk associated with password handling procedures.

11. The computing system of claim 10, wherein the memory further comprises a transient storage component, and wherein the instructions further enable the processing device to maintain the user password in the transient storage component during use while avoiding persistence of the user password in a data storage device, logs, or long-term memory components.

12. The computing system of claim 11, wherein, subsequent to encrypting the digital certificate and user private key using the user password, the instructions further enable the processing device to delete the user password from the transient storage component.

13. The computing system of claim 10, further comprising a network interface, wherein the instructions further enable the processing device to perform one of a) a step of transmit the digital certificate to the client via the network interface and b) a step of making the digital certificate available to the client via an online download procedure.

14. The computing system of claim 13, wherein the instructions further enable the processing device to inform the client that the digital certificate and a private key of the second key pair can be decrypted using the user password.

15. A method comprising steps of:
- receiving a certification request from a client, the certification request including at least a) a selection of a modified Public Key Cryptography Standard (PKCS) #12 (P12) file formatting scheme and b) a user password encrypted with a public key of a first key pair;
- using a private key of the first key pair to decrypt the user password;
- issuing a digital certificate for the client based on the certification request, the digital certificate having a second key pair, wherein the step of issuing the digital certificate includes steps of a) generating the digital certificate to include the second key pair and b) signing the digital certificate using the private key of the first key pair; and
- encrypting the digital certificate and a user private key using the user password.

16. The method of claim 15, further comprising a step of maintaining the user password in transient memory while avoiding persistence of the user password in data storage, logs, or long-term memory.

17. The method of claim 15, further comprising one of a) a step of transmitting the digital certificate to the client and b) a step of making the digital certificate available to the client via an online download procedure.

18. The method of claim 15, wherein the step of issuing the digital certificate includes steps of a) generating the digital certificate to include the second key pair and b) signing the digital certificate using the private key of the first key pair.

19. The method of claim 15, wherein the method is performed by a Certificate Authority (CA), and wherein the first key pair is associated with the CA.

20. The method of claim 15, wherein, prior to the step of receiving the certification request, the method comprises a step of providing the public key of the first key pair to the client to enable the client to encrypt the user password.

* * * * *